(12) United States Patent
Tanabiki et al.

(10) Patent No.: US 8,934,674 B2
(45) Date of Patent: Jan. 13, 2015

(54) PERSON DETECTION DEVICE AND PERSON DETECTION METHOD

(75) Inventors: Masamoto Tanabiki, Kanagawa (JP); Kensuke Maruya, Osaka (JP); Mitsuko Fujita, Tokyo (JP); Kyoko Kawaguchi, Tokyo (JP); Yuji Sato, Tokyo (JP)

(73) Assignee: Panasonic Corporation, Osaka (JP)

( * ) Notice: Subject to any disclaimer, the term of this patent is extended or adjusted under 35 U.S.C. 154(b) by 50 days.

(21) Appl. No.: 13/885,900

(22) PCT Filed: Oct. 5, 2011

(86) PCT No.: PCT/JP2011/005619
§ 371 (c)(1),
(2), (4) Date: May 16, 2013

(87) PCT Pub. No.: WO2012/077267
PCT Pub. Date: Jun. 14, 2012

(65) Prior Publication Data
US 2013/0251203 A1 Sep. 26, 2013

(30) Foreign Application Priority Data
Dec. 9, 2010 (JP) ................................. 2010-274675

(51) Int. Cl.
*G06K 9/00* (2006.01)
*G06T 7/00* (2006.01)

(52) U.S. Cl.
CPC ........ *G06K 9/00369* (2013.01); *G06K 9/00362* (2013.01); *G06T 7/0046* (2013.01); *G06T 2207/20096* (2013.01); *G06T 2207/30196* (2013.01)

USPC .......................................... 382/103; 348/169

(58) Field of Classification Search
USPC ......... 382/100, 103, 117, 118, 181, 190, 203, 382/206, 209; 348/169–172
See application file for complete search history.

(56) References Cited

U.S. PATENT DOCUMENTS

| 6,681,032 B2 * | 1/2004 | Bortolussi et al. ............ 382/118 |
| 7,274,800 B2 * | 9/2007 | Nefian et al. .................. 382/103 |

(Continued)

FOREIGN PATENT DOCUMENTS

| JP | 2005-071344 A | 3/2005 |
| JP | 2005-78257 A | 3/2005 |

(Continued)

OTHER PUBLICATIONS

International Search Report for PCT/JP2011/005619 dated Nov. 15, 2011.

(Continued)

*Primary Examiner* — Anand Bhatnagar
(74) *Attorney, Agent, or Firm* — Pearne & Gordon LLP

(57) ABSTRACT

Provided is a person detection device with which it is possible to estimate a state of a part of a person from an image. A person detection device (100) comprises: an evaluation unit (430) which acquires a prescribed outline of a person from an evaluation image; and a shoulder position calculation unit (440) and an orientation estimation unit (500) which estimate a state of a prescribed part of a person which is included in the evaluation image from the prescribed outline of the person which is acquired from the evaluation image, on the basis of an estimation model which denotes a relation between the prescribed outline and the state of the prescribed part of the person.

8 Claims, 19 Drawing Sheets

(56) References Cited

U.S. PATENT DOCUMENTS

| | | |
|---|---|---|
| 7,734,062 B2 | 6/2010 | Kato et al. |
| 8,233,661 B2 * | 7/2012 | Ikenoue .................. 382/103 |
| 8,265,791 B2 * | 9/2012 | Song et al. .................. 700/253 |
| 2005/0084141 A1 | 4/2005 | Kato et al. |
| 2005/0105770 A1 * | 5/2005 | Sumitomo et al. ............ 382/103 |
| 2011/0001813 A1 * | 1/2011 | Kim et al. ................. 348/77 |
| 2012/0051594 A1 * | 3/2012 | Kim et al. ................. 382/103 |

FOREIGN PATENT DOCUMENTS

| | | |
|---|---|---|
| JP | 2005-149144 A | 6/2005 |
| JP | 2009-288917 A | 12/2009 |
| JP | 2010-157075 A | 7/2010 |

OTHER PUBLICATIONS

Tomokazu Mitsui, Yuji Yamauchi, Hironobu Fujiyoshi, "Human Detection by Two Stages AdaBoost with Joint HOG," 14th Image Sensing Symposium, 2008, SSII08, IN1-06.

Keisuke Oyama, "Motion Analysis of a Driver from Video captured by Driving Recorder", ITE Technical Report, Oct. 25, 2010, vol. 34, No. 44.

\* cited by examiner

IDENTIFICATION NUMBER 1         IDENTIFICATION NUMBER 20

| OMEGA CANDIDATE POINT INFORMATION C ||
|---|---|
| POINT IDENTIFICATION INFORMATION | POSITION |
| REFERENCE POINT | $(x_0, y_0)$ |
| IDENTIFICATION NUMBER 1 | $(x_1, y_1)$ |
| IDENTIFICATION NUMBER 2 | $(x_2, y_2)$ |
| ⋮ | ⋮ |
| IDENTIFICATION NUMBER m | $(x_m, y_m)$ |

FIG. 10

| OMEGA FEATURE VALUE K |||
|---|---|---|
| POINT IDENTIFICATION INFORMATION | RADIUS (DISTANCE) | ANGLE (DIRECTION) |
| IDENTIFICATION NUMBER 1 | $R_1$ | $\theta_1$ |
| IDENTIFICATION NUMBER 2 | $R_2$ | $\theta_2$ |
| ⋮ | ⋮ | ⋮ |
| IDENTIFICATION NUMBER m | $R_m$ | $\theta_m$ |

FIG. 11

| SHOULDER CANDIDATE POINT INFORMATION R | |
|---|---|
| POINT IDENTIFICATION INFORMATION | POSITION |
| REFERENCE POINT | $(x_0, y_0)$ |
| RIGHT SHOULDER POSITION | $(x_{1-s}, y_{1-s})$ |
| LEFT SHOULDER POSITION | $(x_{2-s}, y_{2-s})$ |

FIG. 12

| SHOULDER POSITION FEATURE VALUE Q | | |
|---|---|---|
| POINT IDENTIFICATION INFORMATION | RADIUS (DISTANCE) | ANGLE (DIRECTION) |
| RIGHT SHOULDER POSITION | $R_{1-s}$ | $\theta_{1-s}$ |
| LEFT SHOULDER POSITION | $R_{2-s}$ | $\theta_{2-s}$ |

FIG. 13

| OVERALL OMEGA FEATURE VALUE 690 | | |
|---|---|---|
| IMAGE IDENTIFICATION INFORMATION 691 | OMEGA FEATURE VALUE 692 | SHOULDER POSITION FEATURE VALUE 693 |
| SAMPLE IMAGE 1 | $K_1$ | $Q_1$ |
| SAMPLE IMAGE 2 | $K_2$ | $Q_2$ |
| ⋮ | ⋮ | ⋮ |
| SAMPLE IMAGE N | $K_N$ | $Q_N$ |

FIG. 14

| PRINCIPAL COMPONENT LIST 710 | |
|---|---|
| PRINCIPAL COMPONENT 711 | PRINCIPAL COMPONENT VALUE 712 |
| FIRST PRINCIPAL COMPONENT | $P_1$ |
| SECOND PRINCIPAL COMPONENT | $P_2$ |
| ⋮ | ⋮ |
| $m'$-TH PRINCIPAL COMPONENT | $P_{m'}$ |

FIG. 15

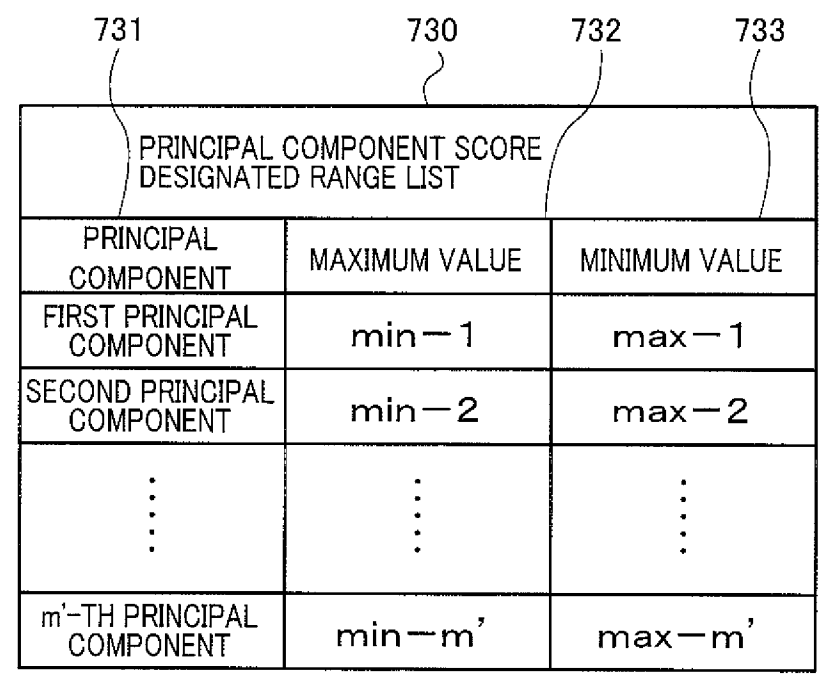

| PRINCIPAL COMPONENT SCORE DESIGNATED RANGE LIST 730 | | |
|---|---|---|
| PRINCIPAL COMPONENT 731 | MAXIMUM VALUE 732 | MINIMUM VALUE 733 |
| FIRST PRINCIPAL COMPONENT | min—1 | max—1 |
| SECOND PRINCIPAL COMPONENT | min—2 | max—2 |
| ..... | ..... | ..... |
| m'-TH PRINCIPAL COMPONENT | min—m' | max—m' |

FIG. 17

| SAMPLE OMEGA IMAGE LIST 750 | |
|---|---|
| SAMPLE OMEGA IMAGE IDENTIFICATION INFORMATION 751 | SAMPLE OMEGA FEATURE VALUE 752 |
| 1 | $V_1$ |
| 2 | $V_2$ |
| ..... | ..... |
| H | $V_H$ |

FIG. 20

| OMEGA POINT IDENTIFICATION INFORMATION 781 | DEGREE OF INFLUENCE LIST 780 | | | | |
|---|---|---|---|---|---|
| | DEGREE OF INFLUENCE ON RIGHT SHOULDER RADIUS 782 | DEGREE OF INFLUENCE ON RIGHT SHOULDER ANGLE 783 | DEGREE OF INFLUENCE ON LEFT SHOULDER RADIUS 784 | DEGREE OF INFLUENCE ON LEFT SHOULDER ANGLE 785 | WEIGHT 786 |
| IDENTIFICATION POINT 1 | $E_{1 \to RR}$ | $E_{1 \to R\theta}$ | $E_{1 \to LR}$ | $E_{1 \to L\theta}$ | $\gamma_1$ |
| IDENTIFICATION POINT 2 | $E_{1 \to RR}$ | $E_{2 \to R\theta}$ | $E_{2 \to LR}$ | $E_{2 \to L\theta}$ | $\gamma_2$ |
| ..... | ..... | ..... | ..... | ..... | ..... |
| IDENTIFICATION POINT 20 | $E_{20 \to RR}$ | $E_{20 \to R\theta}$ | $E_{20 \to LR}$ | $E_{20 \to L\theta}$ | $\gamma_3$ |

FIG. 22

| SAMPLE OMEGA IMAGE IDENTIFICATION INFORMATION | CUTTING-OUT POSITION | MATCHING SCORE |
|---|---|---|
| 1 | $C_1$ | $MS_1$ |
| 2 | $C_2$ | $MS_2$ |
| ..... | ..... | ..... |
| H | $C_H$ | $MS_H$ |

MATCHING RESULT LIST

PERSON DETECTION DEVICE AND PERSON DETECTION METHOD

TECHNICAL FIELD

The present invention relates to a person detection apparatus and a person detection method that detect a person from an image.

BACKGROUND ART

In recent years, research on detecting a person, using an image captured by a camera has been conducted. In particular, because the outline of the head and shoulders of a person represents a characteristic shape of a person, attention has been focused on detecting a person, using an edge-based feature value of this outline. The outline of the head and shoulders of a person resembles the omega ($\Omega$) symbol of the Greek alphabet, so that the outline is called an "omega figure" or an "omega shape," for example.

A technology described in Non-Patent Literature (hereinafter, abbreviated as "NPL") 1, (the technology is referred to as "related art," hereinafter) focuses on the omega shape in detecting a person from an image. The related art uses a Boosting method such as Real AdaBoost to learn tendencies of feature values of images including the omega shape from several thousands to several tens of thousands of sample images. Based on this learning, the related art generates a classifier that classifies images between images including the omega shape and images not including the omega shape. Examples of feature values include HoG (histogram of gradient) feature values, Sparse feature values and Haar feature values. Examples of learning methods include a Boosting method, an SVM (support vector machine) and a neural network.

According to the related art as described above, it is possible to determine at which positions the head and shoulders of a person are located in an image based on low-dimensional information with a small processing load.

CITATION LIST

Non-Patent Literature

NPL 1
Tomokazu Mitsui, Yuji Yamauchi, Hironobu Fujiyoshi, "Human Detection by Two Stages AdaBoost with Joint HOG," 14th Image Sensing Symposium, 2008, SSII08, IN1-06.

SUMMARY OF INVENTION

Technical Problem

In an attempt to detect a suspicious person from an image captured by a surveillance camera or to analyze the actions of a worker from an image captured in a factory, it is desirable that the posture or actions or the like of the person can be detected automatically from the image. In order to perform automatic detection of this kind, it is necessary to estimate, from the image, the states of parts of the body of the person, such as the position and orientation of the shoulders or the inclination of the head with respect to the shoulders.

However, according to the related art, although it is possible to estimate the position of the head and shoulders of a person, the states of the aforementioned parts cannot be estimated.

An object of the present invention is to provide a person detection apparatus and a person detection method that can estimate a state of a part of a person from an image.

Solution to Problem

A person detection apparatus according to an aspect of the present invention includes: an evaluation section that acquires a predetermined outline of a person from an evaluation image; and an estimation section that estimates, on a basis of an estimation model that shows a relationship between the predetermined outline of a person and a state of a predetermined part of the person, a state of the predetermined part of a person included in the evaluation image based on the predetermined outline acquired from the evaluation image.

A person detection method according an aspect of the present invention includes: acquiring a predetermined outline of a person from an evaluation image; and estimating, on a basis of an estimation model that shows a relationship between the predetermined outline of a person and a state of a predetermined part of the person, a state of the predetermined part of a person included in the evaluation image based on the predetermined outline acquired from the evaluation image.

Advantageous Effects of Invention

According to the present invention, a state of a part of a person can be estimated from an image.

BRIEF DESCRIPTION OF DRAWINGS

FIG. 10 illustrates an example of the structure of omega candidate point information according to the present embodiment;

FIG. 11 illustrates an example of the structure of omega feature values according to the present embodiment;

FIG. 12 illustrates an example of the structure of shoulder candidate point information according to the present embodiment;

FIG. 13 illustrates an example of the structure of shoulder position feature values according to the present embodiment;

FIG. 14 illustrates an example of the structure of overall omega feature values according to the present embodiment;

FIG. 15 illustrates an example of the structure of a principal component list according to the present embodiment;

FIG. 17 illustrates an example of the structure of a principal component score designated range list according to the present embodiment;

FIG. 20 illustrates an example of the structure of a sample omega image list according to the present embodiment;

FIG. 22 illustrates an example of the structure of a degree of influence list according to the present embodiment; and FIG. 23 illustrates an example of the structure of a matching result list according to the present embodiment.

DESCRIPTION OF EMBODIMENTS

An embodiment of the present invention will be described in detail hereunder with reference to the drawings. The present embodiment is an example in which the present invention is applied to an apparatus that estimates the position and orientation of the shoulders of a person using an omega shape from an image.

Figure 1:
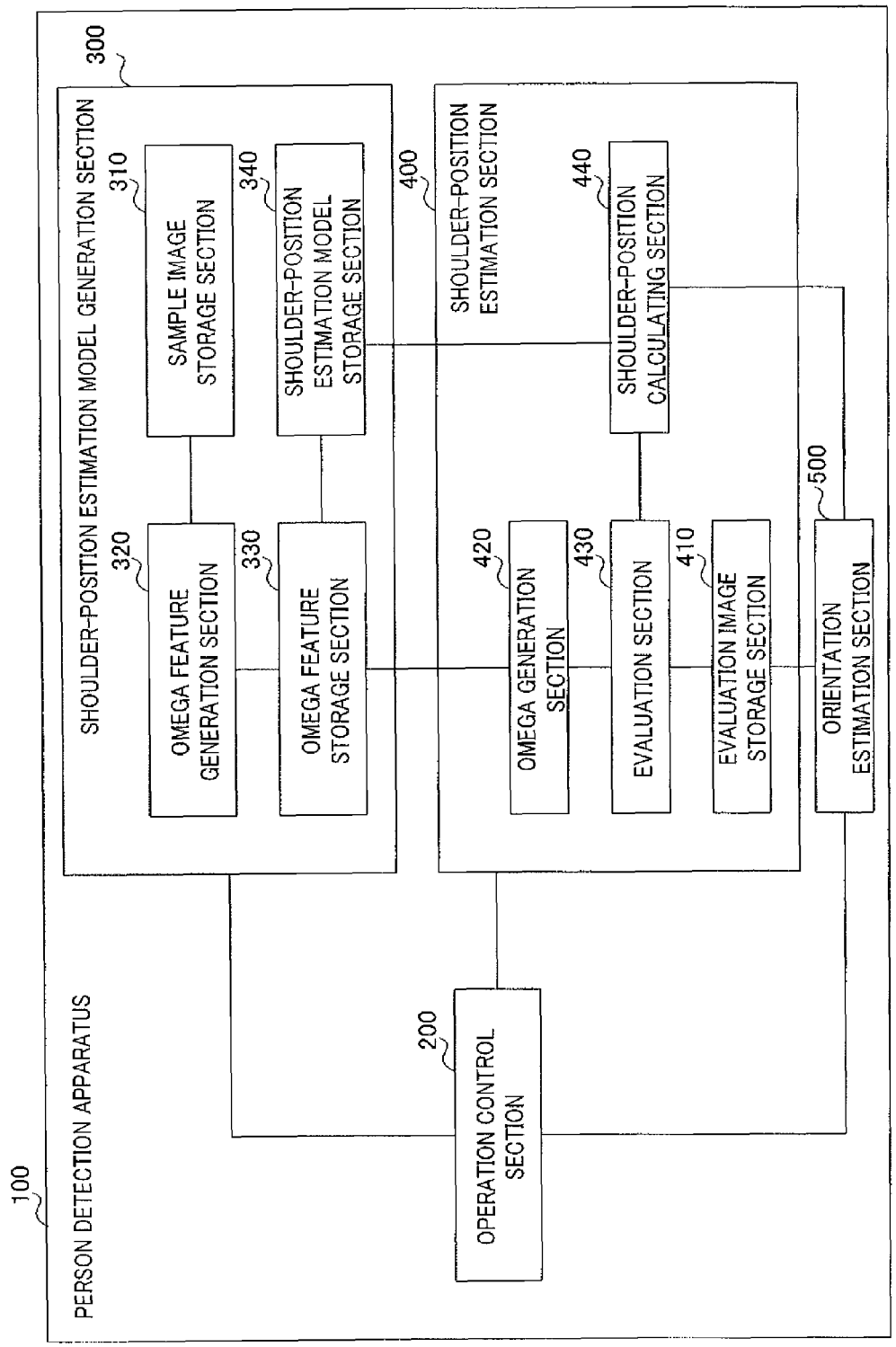
FIG. 1 is a block diagram illustrating a configuration of a person detection apparatus according to an embodiment of the present invention.

FIG. 1 is a block diagram illustrating the configuration of a person detection apparatus according to the present embodiment.

In FIG. 1, person detection apparatus 100 includes operation control section 200, Shoulder-position estimation model generation section 300, shoulder-position estimation section 400, and orientation estimation section 500.

Operation control section 200 provides an operation screen that allows a user to operate person detection apparatus 100. Operation control section 200 notifies each section of the contents of operation performed by the user and also displays an evaluation result image received as input from orientation estimation section 500 and presents an estimation result image to be described hereinafter, to the user.

Shoulder-position estimation model generation section 300 acquires an omega shape (predetermined outline of a person) and a position of shoulders (state of a predetermined part of a person) in a sample image, and generates a shoulder position estimation model that shows the relationship between the omega shape and the position of the shoulders. Shoulder-position estimation model generation section 300 includes sample image storage section 310, omega feature generation section 320, omega feature storage section 330 and shoulder-position estimation model storage section 340.

Sample image storage section 310 stores sample images (N images) including an omega shape for generating a shoulder position estimation model.

Omega feature generation section 320 extracts overall omega feature values from sample images stored in sample image storage section 310, and outputs the extracted overall omega feature values to shoulder-position estimation model storage section 340. The term "overall omega feature value" refers to information in which an omega feature value and a shoulder position feature value are associated with each other for each sample image. The term "omega feature value" refers to information that represents a feature of an omega shape. The term "shoulder position feature value" refers to information that represents a position of a shoulder relative to a position of an omega shape (hereunder, referred to as "shoulder position").

Omega feature storage section 330 performs a principal component analysis with respect to the received overall omega feature values, and generates and stores a principal component list and a principal component score list. The term "principal component list" refers to information that describes principal components of the overall omega feature values. The term "principal component score list" refers to information in which a score of each principal component is described for each sample image.

Omega feature storage section 330 also generates and stores a principal component score designated range list. The term "principal component score designated range list" refers to information that describes a designated range of scores for each principal component.

Omega feature storage section 330 outputs the received overall omega feature values to shoulder-position estimation model storage section 340. The principal component list, the principal component score list, and the principal component score designated list are collectively referred to hereunder as "omega generation information."

Shoulder-position estimation model storage section 340 generates and stores a shoulder position estimation model that shows a relationship between an omega shape and positions of shoulders based on the received overall omega feature values. More specifically, shoulder-position estimation model storage section 340 stores, as a shoulder position estimation model, a regression coefficient matrix obtained by performing a multiple regression analysis using shoulder position feature values (N rows) as objective variables and omega feature values (N rows) as explanatory variables.

Shoulder-position estimation section 400 acquires an omega shape (outline of a person) from an evaluation image, and estimates the positions of the shoulders (state of a part of a person) of a person included in the evaluation image from the acquired omega shape on the basis of the shoulder position estimation model. Shoulder-position estimation section 400 includes evaluation image storage section 410, omega generation section 420, evaluation section 430 and shoulder-position calculating section 440.

Evaluation image storage section 410 stores an evaluation image that serves as a target for detection of a person. In the present embodiment, it is assumed that an evaluation image is an edge image obtained by extracting an edge portion of an image captured by a camera or the like.

Omega generation section 420 generates an omega image based on omega generation information stored by omega feature storage section 330, and outputs the generated omega image to evaluation section 430. The term "omega image" refers to an image in which an omega shape has been reconstructed as an image.

In the present embodiment, it is assumed that omega generation section 420 reconstructs omega shapes of different types by changing a combination of values that are adopted from among the omega generation information. Hereunder, an omega shape that has been reconstructed based on omega generation information is referred to as a "sample omega shape," an image including a sample omega shape is referred to as a "sample omega image," and an omega feature value that shows a feature of a sample omega shape is referred to as a "sample omega feature value."

Evaluation section 430 performs edge matching between received sample omega images and an evaluation image to evaluate the similarity between the evaluation image and each of the sample omega images. Furthermore, evaluation section 430 acquires a sample omega feature value of a sample omega image similar to the evaluation image as an omega feature value of an omega shape included in the evaluation image, and outputs the acquired omega feature value to shoulder-position calculating section 440. Hereunder, an omega shape obtained from an evaluation image is referred to as an "evaluation omega shape," and an omega feature value obtained from an evaluation image is referred to as an "evaluation omega feature value."

Shoulder-position calculating section 440 estimates a shoulder position feature value based on a received evaluation omega feature value, using the shoulder position estimation model stored by shoulder-position estimation model storage section 340 and outputs the estimated shoulder position feature value to orientation estimation section 500. Hereunder, a shoulder position feature value estimated based on an evaluation omega feature value is referred to as an "evaluation shoulder position feature value." The evaluation shoulder position feature value is information that shows a shoulder position of a person included in an evaluation image.

Orientation estimation section 500 estimates the orientation of a shoulder (hereunder, referred to as "shoulder orientation") of a person included in an evaluation image based on a received evaluation shoulder position feature value. Furthermore, orientation estimation section 500 acquires an evaluation image from evaluation image storage section 410, generates an evaluation result image in which an image showing a shoulder position and shoulder orientation (a state of a part of a person) is superimposed on the evaluation image, and outputs the evaluation result image to operation control section 200.

Note that person detection apparatus 100 is configured by, for example, a computer system that has a communication function (personal computer or workstation or the like). Although not shown in the drawings, the computer system broadly includes an input apparatus, a computer unit, an output apparatus, and a communication apparatus. The input apparatus is a keyboard or a mouse, for example. The output apparatus is, for example, a display or a printer. The communication apparatus is, for example, a communication interface that can connect to an IP network. The computer unit, for example, mainly includes a CPU (central processing unit) and a storage apparatus. The CPU has a control function and a computing function. The storage apparatus includes, for example, a ROM (read only memory), which stores programs and data, and a RAM (random access memory), which temporarily stores data. The ROM can be a flash memory whose contents can be electrically rewritten.

Person detection apparatus 100 configured in the manner described above uses the shoulder position estimation model that shows the relationship between an omega shape and a shoulder position, so that person detection apparatus 100 can estimate a shoulder position and a shoulder orientation of a person included in an evaluation image based on the evaluation image.

Next, the operation of person detection apparatus 100 will be described.

Figure 2:
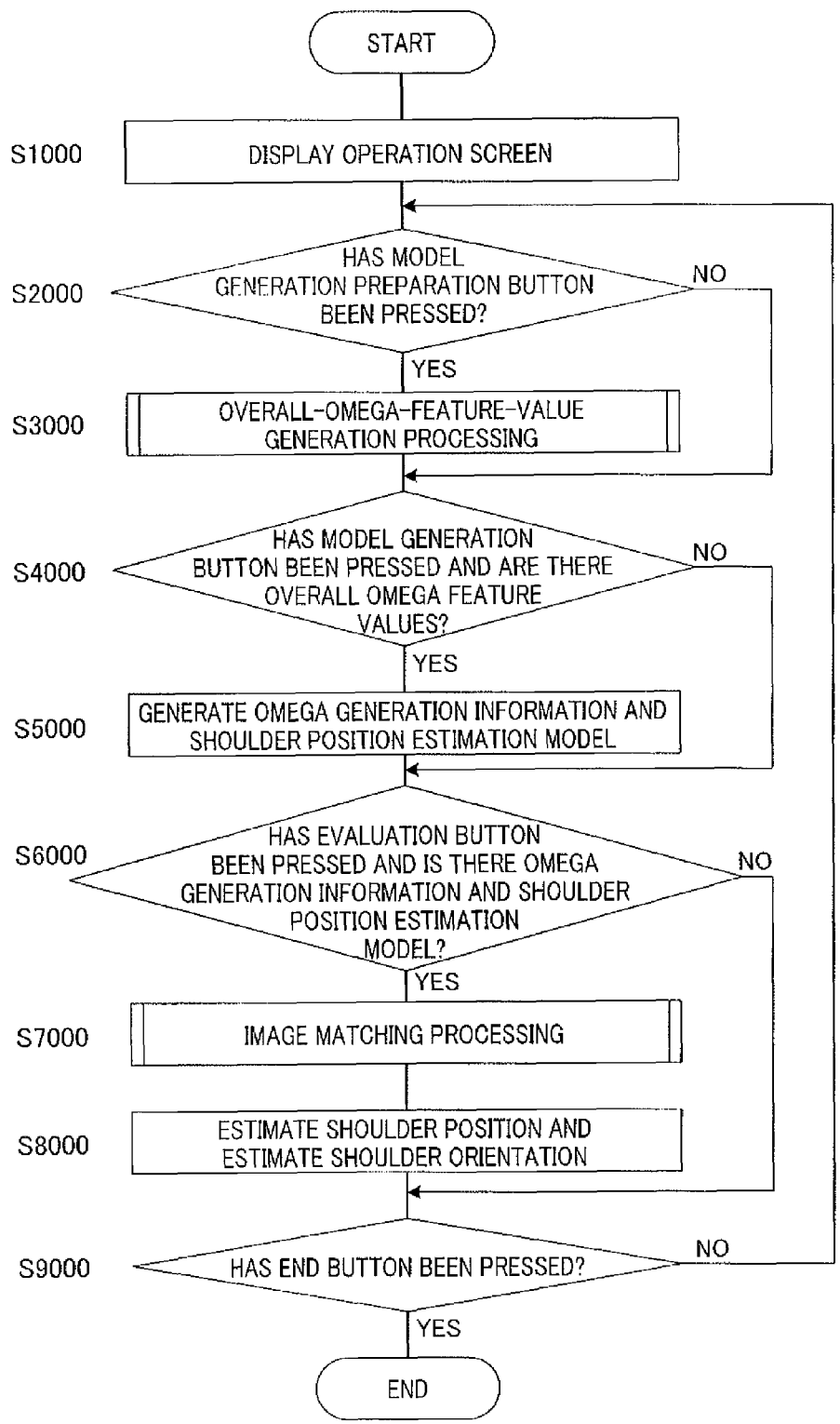
FIG. 2 is a flowchart illustrating an example of operation of the person detection apparatus according to the present embodiment.

FIG. 2 is a flowchart that illustrates an example of the operation of person detection apparatus 100.

In step S1000, operation control section 200 generates and displays an operation screen on an output apparatus such as a liquid crystal display.

Figure 3:
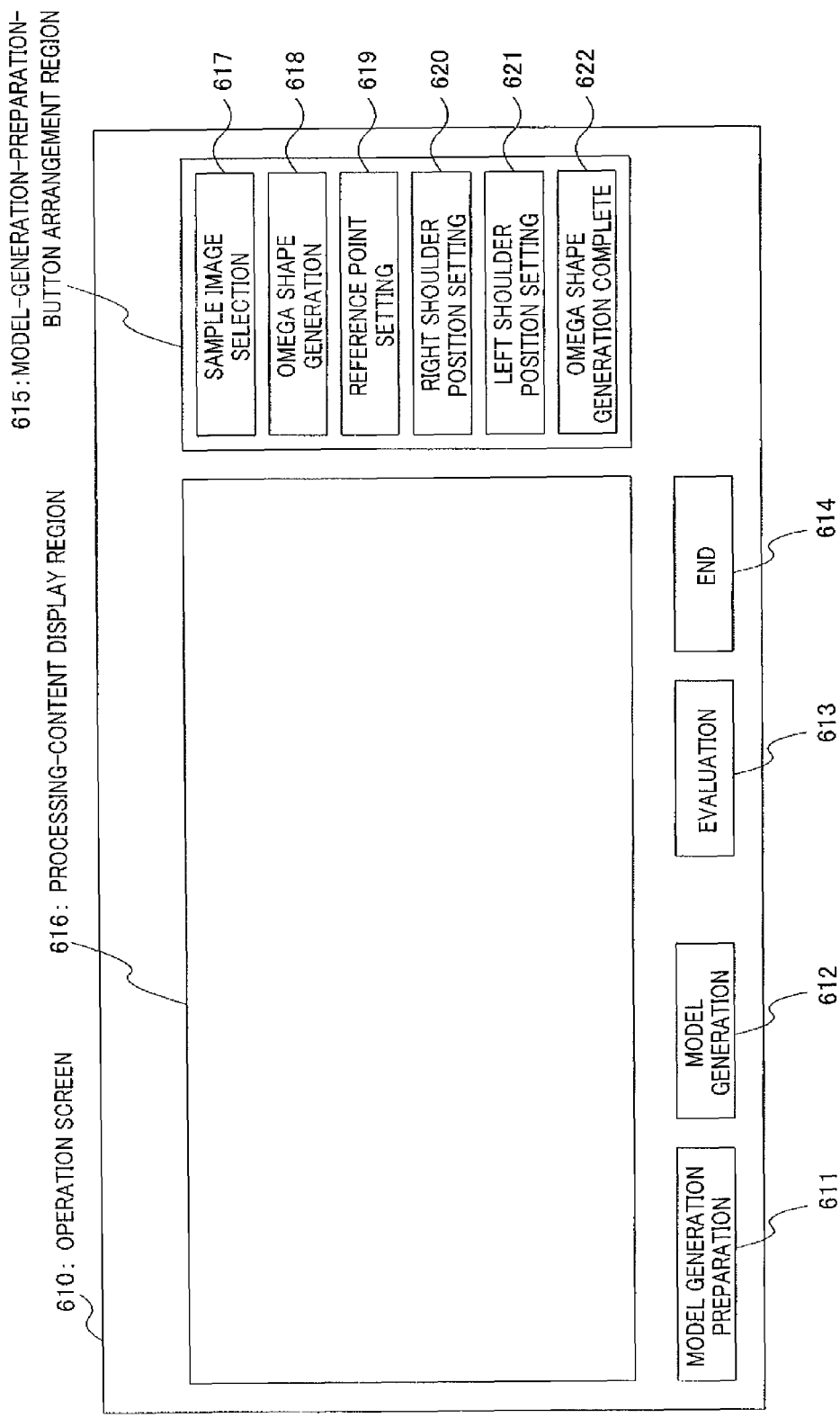
FIG. 3 illustrates an example of an operation screen according to the present embodiment.

FIG. 3 illustrates an example of the operation screen.

As shown in FIG. 3, operation screen 610 includes "model generation preparation" button 611, "model generation" button 612, "evaluation" button 613, "end" button 614, model-generation-preparation-button arrangement region 615 and processing-content display region 616.

Model-generation-preparation-button arrangement region 615 includes "sample image selection" button 617, "omega shape generation" button 618, "reference point setting" button 619, "right shoulder position setting" button 620, "left shoulder position setting" button 621 and "omega shape generation complete" button 622.

It is possible to press "model generation preparation" button 611, "model generation" button 612, "evaluation" button 613 and "end" button 614 at any time. However, a configuration may also be adopted in which "model generation preparation" button 611 cannot be pressed when a sample image has not been prepared. Furthermore, a configuration may be adopted in which "model generation" button 612 cannot be pressed when omega generation information has not been prepared. Furthermore, a configuration may be adopted in which "evaluation" button 613 cannot be pressed when a shoulder position estimation model and an evaluation image have not been prepared.

Buttons 617 to 622, which are arranged in model-generation-preparation-button arrangement region 615, can be pressed only during a period from when "model generation preparation" button 611 is pressed until any of buttons 612 to 614 is pressed.

"Model generation preparation" button 611 is a button for allowing a user to input an instruction to generate omega generation information. Each time "model generation preparation" button 611 is pressed, operation control section 200 sends a "model generation preparation request" to Shoulder-position estimation model generation section 300.

"Model generation" button 612 is a button for allowing a user to input an instruction to generate a shoulder position estimation model. Each time "model generation" button 612 is pressed, operation control section 200 sends a "model generation request" to Shoulder-position estimation model generation section 300.

"Evaluation" button 613 is a button for allowing a user to input an instruction to evaluate an evaluation image and output the evaluation result (shoulder position and shoulder orientation). Each time "evaluation" button 613 is pressed, operation control section 200 sends an "evaluation request" to shoulder-position estimation section 400.

"End" button 614 is a button for allowing a user to input an instruction to end a series of processing. When "end" button 614 is pressed, operation control section 200 sends an "end" notification to Shoulder-position estimation model generation section 300 and shoulder-position estimation section 400.

Processing-content display region 616 displays a character string or diagram that shows the progress of processing or a processing result, or an image received from shoulder-position estimation model generation section 300 and orientation estimation section 500 or the like. Operation control section 200 receives pointing operation performed by means of pointer operation or the like with respect to each position of processing-content display region 616.

Each time any one of buttons 617 to 622 of model-generation-preparation-button arrangement region 615 is pressed, operation control section 200 sends information showing which button was pressed to shoulder-position estimation model generation section 300 and shoulder-position estimation section 400. In this case, as necessary, operation control section 200 also sends information that indicates which position is pointed at to shoulder-position estimation model generation section 300 and shoulder-position estimation section 400.

Subsequently, in step S2000 in FIG. 2, omega feature generation section 320 determines whether or not "model generation preparation" button 611 has been pressed, that is, whether or not a "model generation preparation request" has been sent.

If "model generation preparation" button 611 has been pressed (S2000: YES), omega feature generation section 320 proceeds to step S3000. In contrast, if "model generation preparation" button 611 has not been pressed (S2000: No), omega feature generation section 320 proceeds to step S4000.

In step S3000, person detection apparatus 100 performs overall-omega-feature-value generation processing.

Figure 4:
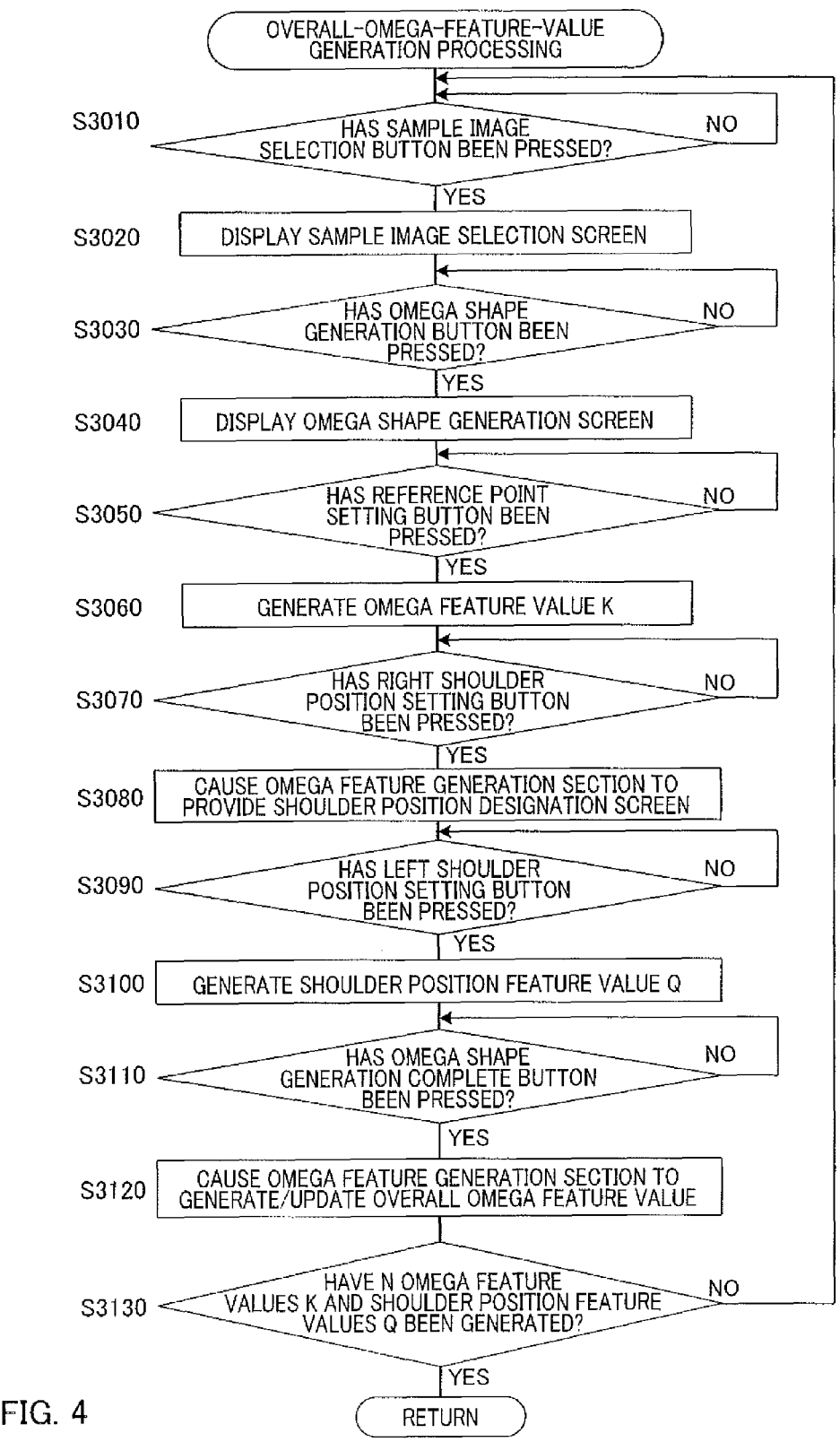
FIG. 4 is a flowchart illustrating an example of overall omega feature-value generation processing according to the present embodiment.

FIG. 4 is a flowchart that illustrates an example of overall-omega-feature-value generation processing.

First, in step S3010, omega feature generation section 320 stands by for notification that "sample image selection" button 617 is pressed from operation control section 200. Upon receiving notification indicating that "sample image selection" button 617 has been pressed (S3010: YES), omega feature generation section 320 proceeds to step S3020.

In step S3020, omega feature generation section 320 outputs data of a sample image selection screen to operation control section 200, to cause the sample image selection screen to be displayed in processing-content display region 616. The sample image selection screen is a screen that receives, from a user, a selection of a sample image to be used to generate omega generation information from among sample images stored in sample image storage section 310. The sample image selection screen, for example, displays a thumbnail or an attribute such as a file name of each sample image as choices.

Next, in step S3030, omega feature generation section 320 stands by for notification from operation control section 200 of information indicating that "omega shape generation" button 618 has been pressed and also indicating the selected sample image. When notified of information indicating that "omega shape generation" button 618 has been pressed and also indicating the selected sample image is notified (S3030: YES), omega feature generation section 320 proceeds to step S3040.

In step S3040, omega feature generation section 320 outputs data of an omega shape generation screen that includes the selected sample image to operation control section 200, to cause the omega shape generation screen to be displayed in processing-content display region 616. The omega shape generation screen is a screen for receiving setting of an omega shape with respect to a sample image from a user. In the present embodiment, it is assumed that setting of an omega shape is performed by setting positions of omega candidate points forming an omega shape.

Figure 5:
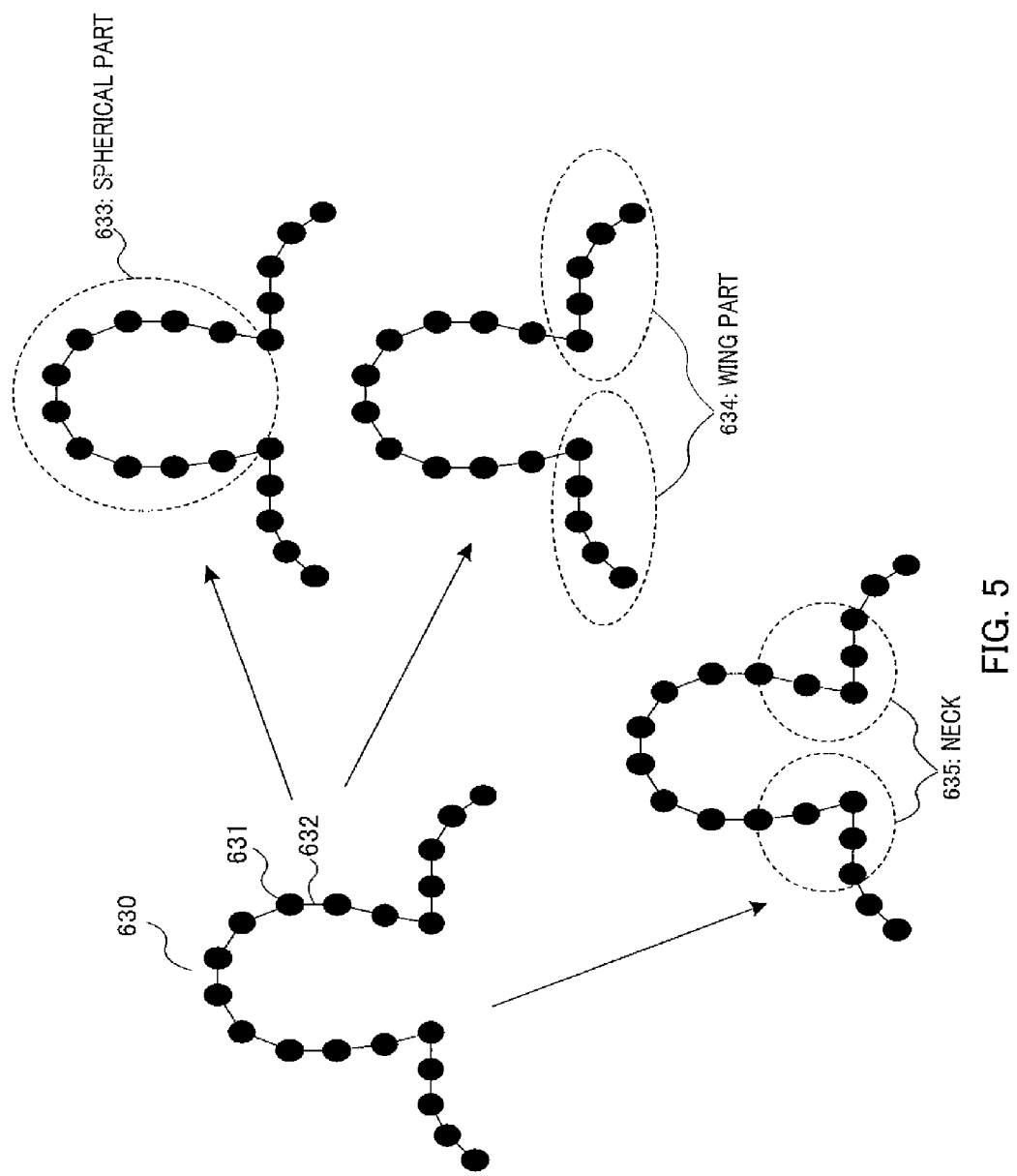
FIG. 5 illustrates an example of the image of an omega shape according to the present embodiment.

FIG. 5 illustrates an example of the image of an omega shape.

As shown in FIG. 5, it is assumed that person detection apparatus 100 handles omega shape 630 that shows the outline of the head and shoulders of a person, as positions of a plurality of points 631. When points 631 adjacent to each other are connected by straight line 632, straight lines 632 as a whole form a shape similar to the outline of the head and shoulders of a person.

Omega shape 630 includes a portion denoted by reference numeral 633, which mainly represents the outline of the head (hereunder, referred to as "spherical part"), and a portion denoted by 634, which mainly represents the outline of the shoulders (hereunder, referred to as "wing part"). Neck part 635 often exists at a boundary between spherical part 633 and wing part 634. That is, omega shape 630 forms a characteristic shape.

Omega feature generation section 320 sets identification numbers in correspondence to the adjacency order to points 631 that form omega shape 630. Hereunder, a point included in omega shape 630 for which a setting with respect to a sample image is received from a user is referred to as an "omega candidate point." That is, the term "omega candidate point" refers to a point on an edge line from the head to the shoulders of a person, which is set by a user.

Figure 6:
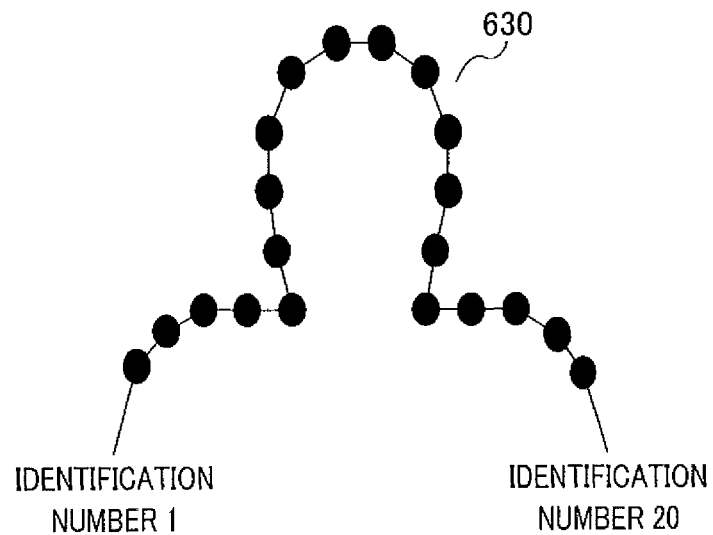
FIG. 6 illustrates an example of identification numbers that are set for omega candidate points according to the present embodiment.

FIG. 6 illustrates an example of identification numbers set at omega candidate points. FIG. 6 illustrates an example of a case where a person is facing frontward and the right shoulder of the person is positioned at the left side of the drawing.

As shown in FIG. 6, omega feature generation section 320 sets integers in ascending order from 1 as identification numbers in sequence from an omega candidate point positioned at an end portion on the right shoulder side of the person. It is assumed that the number of omega candidate points is m (fixed). It is also assumed that m=20 in the present embodiment for the convenience of description.

Figure 7:
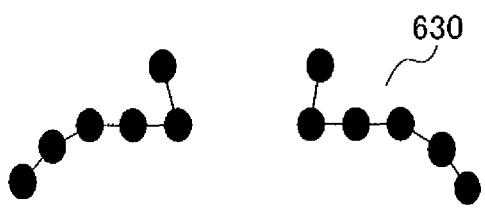
FIG. 7 illustrates another example of the image of an omega shape according to the present embodiment.

Note that omega shape 630 may be a part of the outline of the head and shoulders. For example, as shown in FIG. 7, only a portion corresponding to wing part 634 and neck part 635 illustrated in FIG. 5 may be treated as omega shape 630.

The omega shape generation screen displays an omega figure having a standard shape that can be moved onto a selected sample image and changed in shape. The omega shape generation screen receives a user operation in which the user visually aligns a standard omega figure with an actual omega shape included in a sample image.

FIGS. 8A to 8F illustrates examples of changes in the state of processing-content display region 616.

Figure 8A:
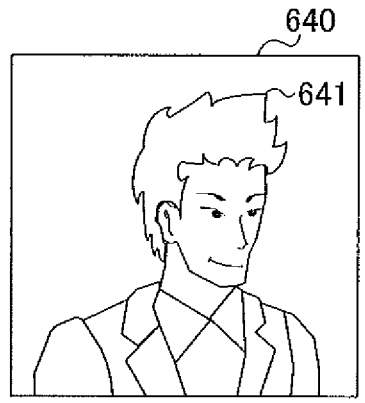
FIG. 8 illustrate examples of changes in the state of a processing-content display region according to the present embodiment.
Figure 8B:
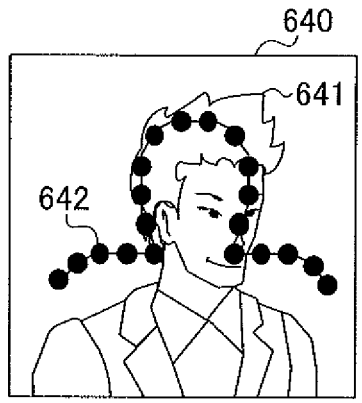
Figure 8C:
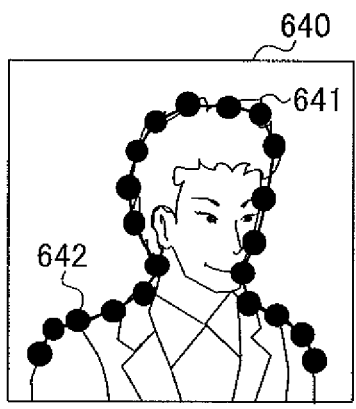

First, as shown in FIG. 8A, omega shape generation screen 640 displays a sample image that is an edge image including omega shape (an edge line of the outline of the head and shoulders of a person) 641. Subsequently, as shown in FIG. 8B, omega shape generation screen 640 displays omega FIG. 642 while superimposing omega FIG. 642 on the sample image. The user moves round points forming omega FIG. 642 on top of omega shape 641 of the sample image by a pointer operation or the like to align the shape of omega FIG. 642 with the omega shape, as shown in FIG. 8C.

According to the present embodiment, when the number of omega candidate points set on an edge line of the outline of shoulder is denoted by "a," and the number of omega candidate points set on an edge line of the outline of head is denoted by "b," the total number of omega candidate points denoted by "m" is represented by equation 1 below.

[1]

$$m = 2a + b \qquad \text{(Equation 1)}$$

For example, a=5 and b=10 is defined as a setting rule of omega FIG. 642. The contents of this setting rule match the most leftward point (point denoted by identification number 1) with an end portion of the right shoulder, the fifth point from the left (point denoted by identification number 5) with the right side of the neck, the most rightward point (point denoted by identification number 20) with an end portion of the left shoulder, and the fifth point from the right (point denoted by identification number 16) with the left side of the neck. In addition, an assumption is made that it is previously determined as a setting rule for omega FIG. 642 that points between the aforementioned four points are placed at regular intervals on omega shape 641.

In step S3050 in FIG. 4, omega feature generation section 320 stands by for notification of information indicating that "reference point setting" button 619 has been pressed from operation control section 200. The term "reference point" refers to a point serving as a reference for the position of each point of an omega shape and a shoulder position. Upon receiving information indicating that "reference point setting" button 619 has been pressed (S3050: YES), omega feature generation section 320 proceeds to step S3060.

Figure 8D:
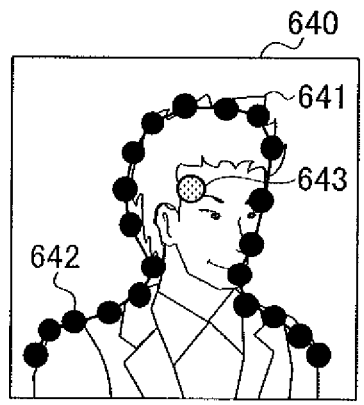

In the present embodiment, an assumption is made that it is previously determined as a reference point setting rule that the reference point is the center of gravity of the head. Therefore, the user estimates the center of gravity of the head of a person from a sample image, and sets reference point 643 at the estimated position as shown in FIG. 8D. Reference point 643 is set by, for example, moving a pointer to a certain position and right-clicking. Setting of a shoulder position and the like to be described hereinafter is performed in a similar manner.

In step S3060, omega feature generation section 320 generates omega candidate point information C that shows the positions of the omega candidate points set by the user, based on the positions of the set omega candidate points and reference point. Subsequently, omega feature generation section 320 generates omega feature values K that represent features of an omega shape based on the position of each omega candidate point relative to the reference point.

Figure 9:
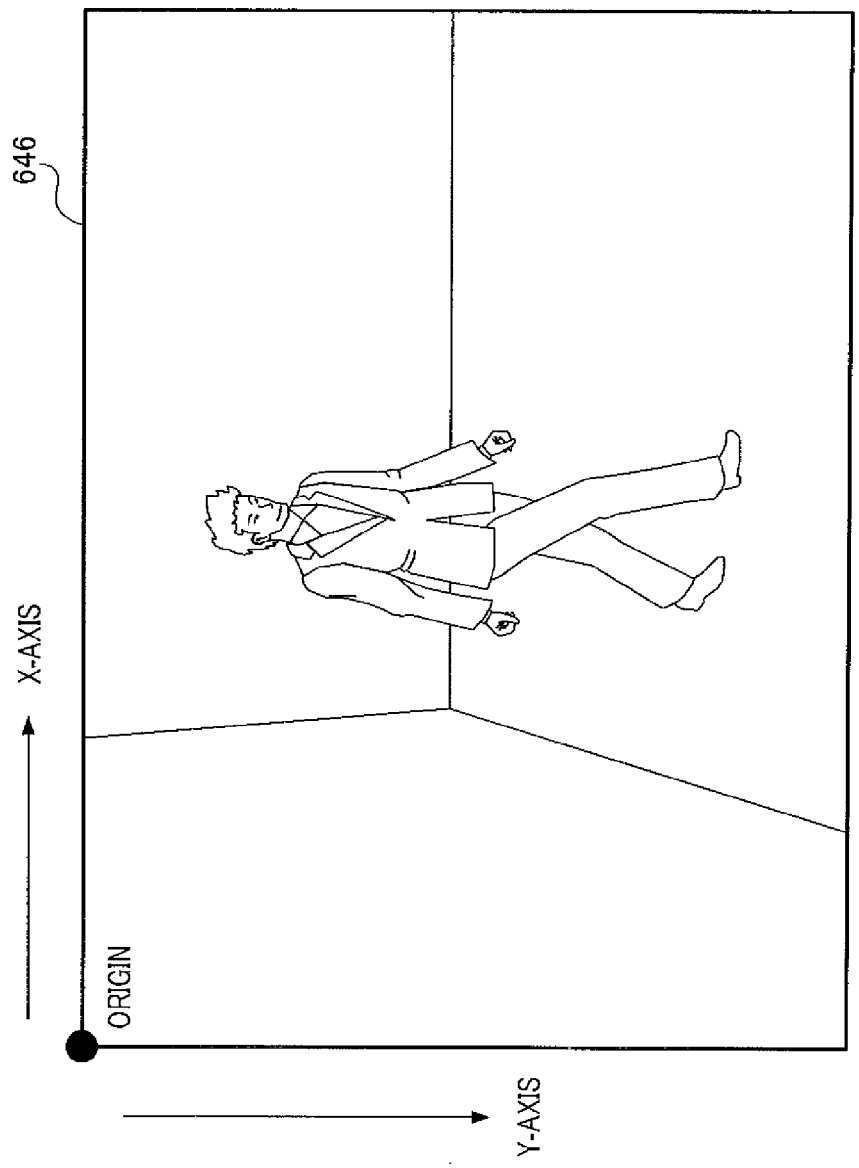
FIG. 9 illustrates an example of omega candidate points and an image coordinate system according to the present embodiment.

FIG. 9 illustrates an example of an image coordinate system used for defining positions of omega candidate points and a reference point.

As shown in FIG. 9, person detection apparatus 100 defines positions of omega candidate points and a reference point, for example, using a coordinate system in which the upper left corner of sample image 646 is taken as the origin, a horizontal direction is taken as the x axis, and a vertical direction is taken as the y axis. Furthermore, person detection apparatus 100 defines a direction of a point, using angle θ ($-\pi \leq \theta \leq \pi$) in a clockwise direction with respect to the y axis.

FIG. 10 illustrates an example of the structure of omega candidate point information C.

As shown in FIG. 10, omega candidate point information 650 (C) describes position 652 in association with the reference point and point identification information 651 for each omega candidate point.

FIG. 11 illustrates an example of the structure of omega feature values K.

As shown in FIG. 11, omega feature value 660 (K) describes, for each omega candidate point, distance 662 from the reference point as well as direction 663 as viewed from the reference point in association with point identification information 661 of the relevant point. That is, omega feature value 660 (K) describes, for each omega candidate point, a radius centering on the reference point, and an angle relative to the y axis of a line that connects the reference point and the omega candidate point in association with point identification information 661 for the relevant point. These values can be calculated based on omega candidate point information C.

That is, omega feature value K is 2m dimensional data $K=(k_1, k_2, \ldots k_m)$ that is a set of omega candidate points represented by two-dimensional data $k=(R, \theta)$. Note that the contents of omega feature value K are not limited to this example, and may be a set of distances in the x-axis direction and distances in the y-axis direction from a reference point, for example.

Single omega feature value K for one sample image is obtained by the processing described so far.

In step S3070 in FIG. 4, omega feature generation section 320 stands by for notification from operation control section 200 of information indicating that "right shoulder position setting" button 620 has been pressed. Upon receiving information indicating that "right shoulder position setting" button 620 has been pressed (S3070: YES), omega feature generation section 320 proceeds to step S3080.

In step S3080, omega feature generation section 320 outputs data for a shoulder position designation screen to operation control section 200, to cause the shoulder position designation screen to be displayed on processing-content display region 616. The shoulder position designation screen is a screen that receives settings from a user for a shoulder position on a sample image.

Figure 8E:
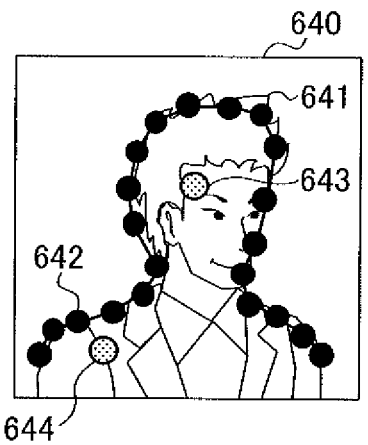

According to the present embodiment, as a shoulder position setting rule, an assumption is made that it is previously determined that a center position of a shoulder joint is taken as a shoulder position. Accordingly, the user estimates the center position of the joint of the right shoulder from the sample image, and as shown in FIG. 8E, sets right shoulder position 644 at the estimated position.

Figure 8F:
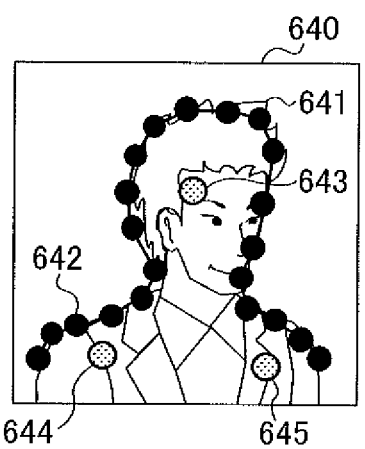

Next, in step S3090 in FIG. 4, omega feature generation section 320 stands by for notification from operation control section 200 of information indicating that "left shoulder position setting" button 621 has been pressed. Upon receiving the information indicating that "left shoulder position setting" button 621 has been pressed (S3090: YES), omega feature generation section 320 proceeds to step S3100. The user estimates the center position of the joint of the left shoulder from the sample image, and as shown in FIG. 8F, sets left shoulder position 645 at the estimated position.

Next, in step S3100, omega feature generation section 320 generates shoulder candidate point information R, which shows the shoulder positions set by the user, based on the set right shoulder position and left shoulder position. Subsequently, omega feature generation section 320 generates shoulder position feature value Q that represents the feature of shoulder position based on each shoulder position relative to the reference point.

FIG. 12 illustrates an example of the structure of shoulder candidate point information R.

As shown in FIG. 12, shoulder candidate point information 670 (R) describes position 672 in association with the reference point and point identification information 671 for each shoulder position.

FIG. 13 illustrates an example of the structure of shoulder position feature value Q.

As shown in FIG. 13, shoulder position feature value 680 (Q) describes, for each shoulder position, distance 682 from the reference point as well as direction 683 as viewed from the reference point in association with point identification information 681 of the relevant point. That is, shoulder position feature value 680(Q) describes, for each shoulder position, a radius centering on the reference point, and an angle relative to the y axis of a line connecting the reference point and the shoulder position in association with point identification information 681 for the relevant point. These values can be calculated based on shoulder candidate point information R.

That is, shoulder position feature value Q is four-dimensional data $Q=(q_1, q_2)$ that is a set of shoulder positions represented by two-dimensional data $q=(R, \theta)$. Note that the contents of shoulder position feature value Q are not limited to this example, and may be a set of distances in the x-axis direction and distances in the y-axis direction from a reference point, for example.

Subsequently, in step S3110 in FIG. 4, omega feature generation section 320 stands by for notification from operation control section 200 of information indicating that "omega shape generation complete" button 622 has been pressed. Upon receiving the information indicating that "omega shape generation complete" button 622 has been pressed (S3110: YES), omega feature generation section 320 proceeds to step S3120.

In step S3120, omega feature generation section 320 integrates omega feature value K and shoulder position feature value Q to generate an overall omega feature value. However, in a case where an overall omega feature value has already been generated, omega feature generation section 320 updates the overall omega feature value by adding the newly generated omega feature value K and shoulder position feature value Q.

Next, in step S3130, omega feature generation section 320 determines whether or not generation of N omega feature values K and shoulder position feature values Q has been completed and these values have been described in the overall omega feature values.

If generation of N omega feature values K and shoulder position feature values Q has not been completed (S3130: No), the processing returns to step S3010 to perform processing for an unprocessed sample image. That is, the operation starting from the time when the user presses "sample image selection" button 617 for a sample image stored in sample image storage section 310 until the user presses "omega shape generation complete" button 622 is repeated N times.

When omega feature generation section 320 has completed generation of N omega feature values K and shoulder position feature values Q (S3130: YES), omega feature generation section 320 outputs the overall omega feature values to omega feature storage section 330, and thereafter, the processing returns to the processing in FIG. 2. The overall omega feature values are stored in omega feature storage section 330.

FIG. 14 illustrates an example of the structure of overall omega feature values stored by omega feature storage section 330.

As shown in FIG. 14, overall omega feature value 690 describes, for each sample image, identification information 691 of a sample image in association with omega feature value 692 and shoulder position feature value 693 that have been generated based on the sample image. The number of rows of overall omega feature values 690 stored by omega feature storage section 330 is N.

In step S4000 in FIG. 2, omega feature storage section 330 determines whether or not "model generation" button 612 has been pressed, that is, whether or not a "model generation request" has been received. Omega feature storage section 330 also determines whether or not there are overall omega feature values that are being stored. Whether or not there are overall omega feature values can be determined, for example, based on whether or not a "model generation preparation request" was received in the past.

If "model generation" button 612 has been pressed and there are overall omega feature values (S4000: YES), omega feature storage section 330 proceeds to step S5000. In contrast, if "model generation" button 612 has not been pressed or if there are no overall omega feature values (S4000: No), omega feature storage section 330 proceeds to step S6000.

In step S5000, omega feature storage section 330 generates and stores omega generation information, and also outputs a "shoulder position estimation model generation request" and overall omega feature values to shoulder-position estimation model storage section 340. Upon receipt of the request and the values, shoulder-position estimation model storage section 340 generates a shoulder position estimation model based on the received overall omega feature values, and stores the shoulder position estimation model therein.

Specifically, omega feature storage section 330 applies a principal component analysis to the overall omega feature values to calculate principal component vectors $P=(p_1, p_2, \ldots p_{m'})$ up to an m'-th principal component. Furthermore, omega feature storage section 330 calculates principal component scores $S=(s_1, s_2, \ldots s_{m'})$ up to the m'-th principal component in correspondence with the principal component vectors P. The value of m' is set to a number such that a cumulative contribution ratio is equal to or greater than a %. The value, "a" is determined by experiments or the like taking into account the processing load and the estimation accuracy.

Omega feature storage section 330 generates a principal component list describing principal components P, and a principal component score list describing principal component scores S.

FIG. 15 illustrates an example of the structure of the principal component list.

As shown in FIG. 15, principal component list 710 describes principal component value 712 $(p_1, p_2, \ldots p_{m'})$ for each principal component 711.

Figure 16:
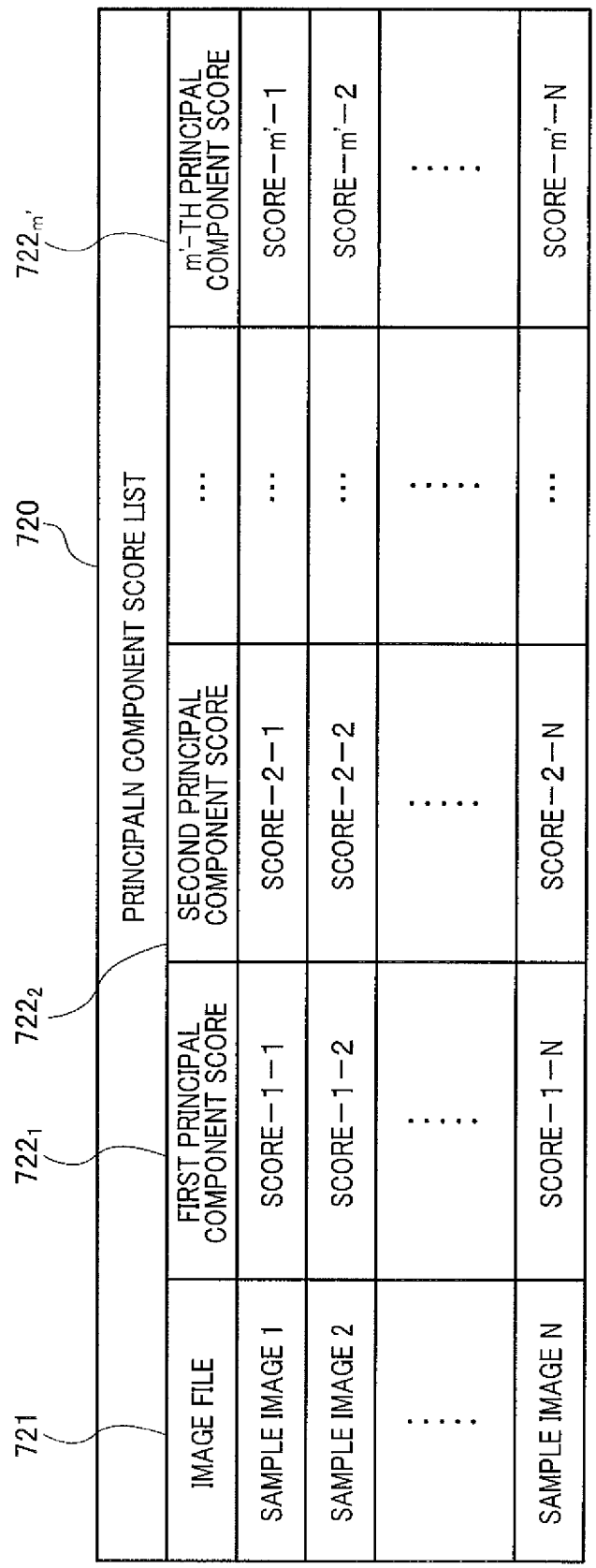
FIG. 16 illustrates an example of the structure of a principal component score list according to the present embodiment.

FIG. 16 illustrates an example of the structure of the principal component score list.

As shown in FIG. 16, principal component score list 720 describes first principal component score $722_1$ to m'-th principal component score $722_{m'}$ for each image file 721.

Omega feature storage section 330 also extracts a maximum value and a minimum value from among the principal component scores with respect to an i-th principal component $(1 \leq i \leq m')$, which correspond to columns of principal component score list 720. Omega feature storage section 330 generates and stores a principal component score designated range list describing a maximum value and a minimum value of each principal component score, that is, a score range.

FIG. 17 illustrates an example of the structure of the principal component score designated range list.

As shown in FIG. 17, for each principal component 731, principal component score designated range list 730 describes maximum value 732 and minimum value 733 of the principal component score.

Note that, a configuration may also be adopted in which omega feature storage section 330 does not create a list of the actual range from the minimum value to the maximum value as principal component score designated range list 730, but creates a list of a range of scores of a narrower range than the actual range, instead.

Shoulder-position estimation model storage section 340 performs a multiple regression analysis using shoulder position feature values Q (N rows) included in the overall omega feature values as an objective variable, and omega feature values K of N rows (N rows) included in the overall omega feature values as an explanatory variable. Shoulder-position estimation model storage section 340 calculates and stores regression coefficient matrix A that satisfies equation 2 below.

[2]

$$Q = KA \qquad \text{(Equation 2)}$$

Shoulder-position estimation model storage section 340 stores the calculated regression coefficient matrix A as a shoulder position estimation model. Note that a configuration may also be adopted in which, at this time, shoulder-position estimation model storage section 340 outputs a "model generation complete notification" to operation control section 200 to cause processing-content display region 616 to output a character string such as "shoulder position estimation model generation has been completed."

In step S6000 in FIG. 2, evaluation section 430 determines whether or not "evaluation" button 613 has been pressed, that is, whether or not an "evaluation request" has been received.

Furthermore, evaluation section 430 determines whether or not there is stored omega generation information and a stored shoulder position estimation model in shoulder-position estimation model generation section 300. Whether or not there is omega generation information and a shoulder position estimation model can be determined, for example, based on whether or not a "model generation request" was received in the past.

If "evaluation" button 613 has been pressed and there is omega generation information and a shoulder position estimation model (S6000: YES), evaluation section 430 proceeds to step S7000. In contrast, if "evaluation" button 613 has not been pressed or if there is no omega generation information and no shoulder position estimation model (S6000: No), evaluation section 430 proceeds to step S9000.

In step S7000, person detection apparatus 100 performs image matching processing.

Figure 18:
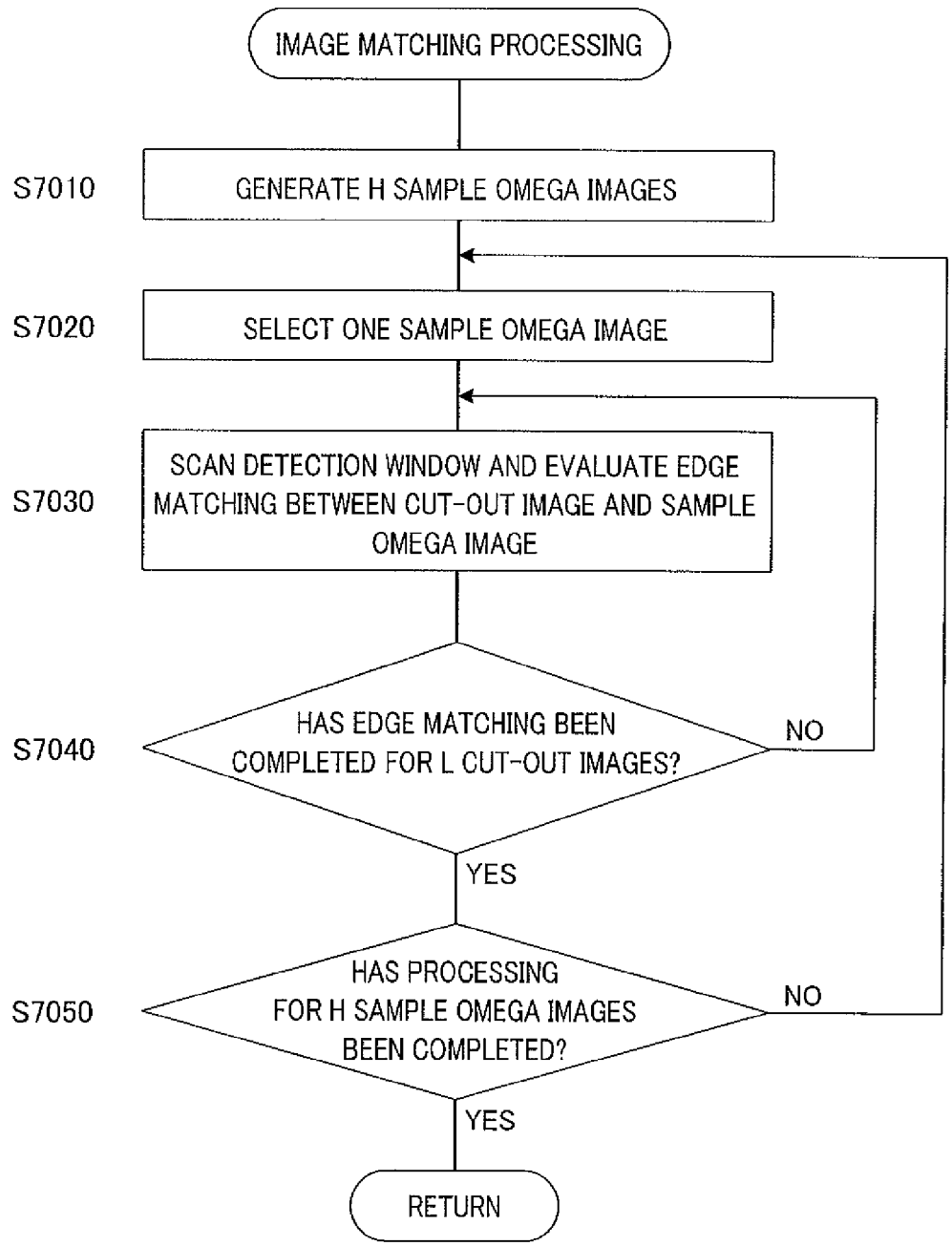
FIG. 18 is a flowchart illustrating an example of image matching processing.

FIG. 18 is a flowchart that illustrates an example of image matching processing.

First, in step S7010, evaluation section 430 acquires an evaluation image from evaluation image storage section 410, and sends an "omega generation request" to omega generation section 420. Upon receiving the "omega generation request," omega generation section 420 generates and stores a sample omega image based on omega generation information stored by omega feature storage section 330.

In this case, omega generation section 420 reconstructs H different types of omega shapes by changing the combination of values adopted as the principal component score of each principal component among the omega generation information. The value, "H" is determined by experiments or the like taking into account the processing load and the estimation accuracy.

Specifically, omega generation section 420 generates principal component scores $S_j$ (j=1 to H) that are formed by values within a range described in principal component score designated range list 730 (see FIG. 17) for each principal component. Note that principal component score $S_j$ does not necessarily match principal component score S of any sample image that is a base image. Omega generation section 420 reconstructs sample omega feature values $V_j$ (j=1 to H) for each selected principal component score $S_j$, for example, by equation 3 below. In this equation, V-bar (capital letter V with a bar above) represents the mean (N dimension) of omega feature values K.

[3]

$$V_j = \bar{V} + PS_j \quad \text{(Equation 3)}$$

Note that when the number of principal component scores $S_f$ of an f-th principal component is taken as $U_f$, a total number of sample omega shapes that can be reconstructed from omega generation information is represented by equation 4 below.

(Equation 4)

$$Num = \prod_{f=1}^{m'} U_f \quad [4]$$

Subsequently, omega generation section 420 generates a sample omega shape indicated by sample omega feature value $V_j$, and generates a sample omega image that includes the sample omega shape. The size of the sample omega image is, for example, the same size as the sample image that is the base image. In this case, it is assumed that the size of the sample omega image is a width of w pixels×a height of h pixels. Furthermore, the sample omega image is an image which depicts the shape indicated by sample omega feature value $V_j$, in which the left upper edge of the image is taken as the origin, and a reference point is placed at the center (w/2, h/2) of the image.

Figure 19:
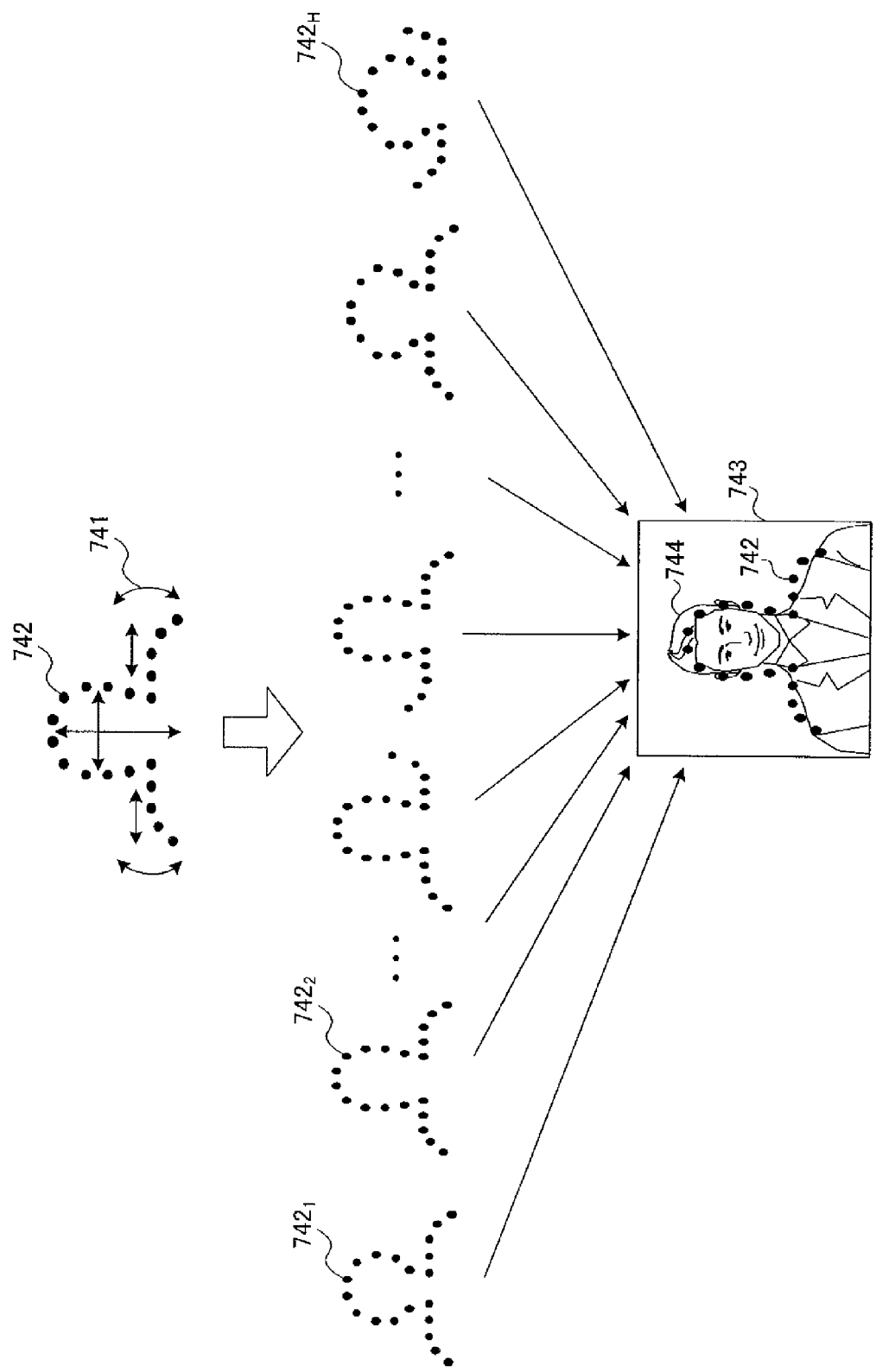
FIG. 19 illustrates an example of how a sample omega image is generated according to the present embodiment.

FIG. 19 illustrates an example of how a sample omega image is generated.

When a combination of the values of principal component score $S_j$ changes, as indicated by arrow 741 in FIG. 19, the shape of sample omega shape 742 that is indicated by sample omega feature value $V_j$ changes. Accordingly, as shown in FIG. 19, H sample omega shapes $742_1$ to $742_H$ are generated from H different principal component scores $S_j$. These sample omega shapes $742_1$ to $742_H$ are compared, one by one, with evaluation omega shape 744 included in evaluation image 743 by processing that is described hereinafter.

Furthermore, omega generation section 420 generates and stores a sample omega image list describing generated sample omega images and sample omega feature values $V_j$ on which the sample omega images are based are described in association with each other.

FIG. 20 illustrates an example of the structure of the sample omega image list.

As shown in FIG. 20, sample omega image list 750 describes sample omega feature values 752 in association with sample omega image identification information 751.

Upon completing generation of sample omega image list 750, omega generation section 420 sends an "omega generation complete" notification to evaluation section 430.

Upon receiving the "omega generation complete" notification, in step S7020 in FIG. 18, evaluation section 430 selects one unselected sample omega image from among the sample omega images stored by omega generation section 420.

Next, in step S7030, evaluation section 430 scans a detection window over the evaluation image and evaluates the edge matching between a cut-out image that is, cut out by the detection window from the evaluation image at a certain position and the sample omega image.

Figure 21:
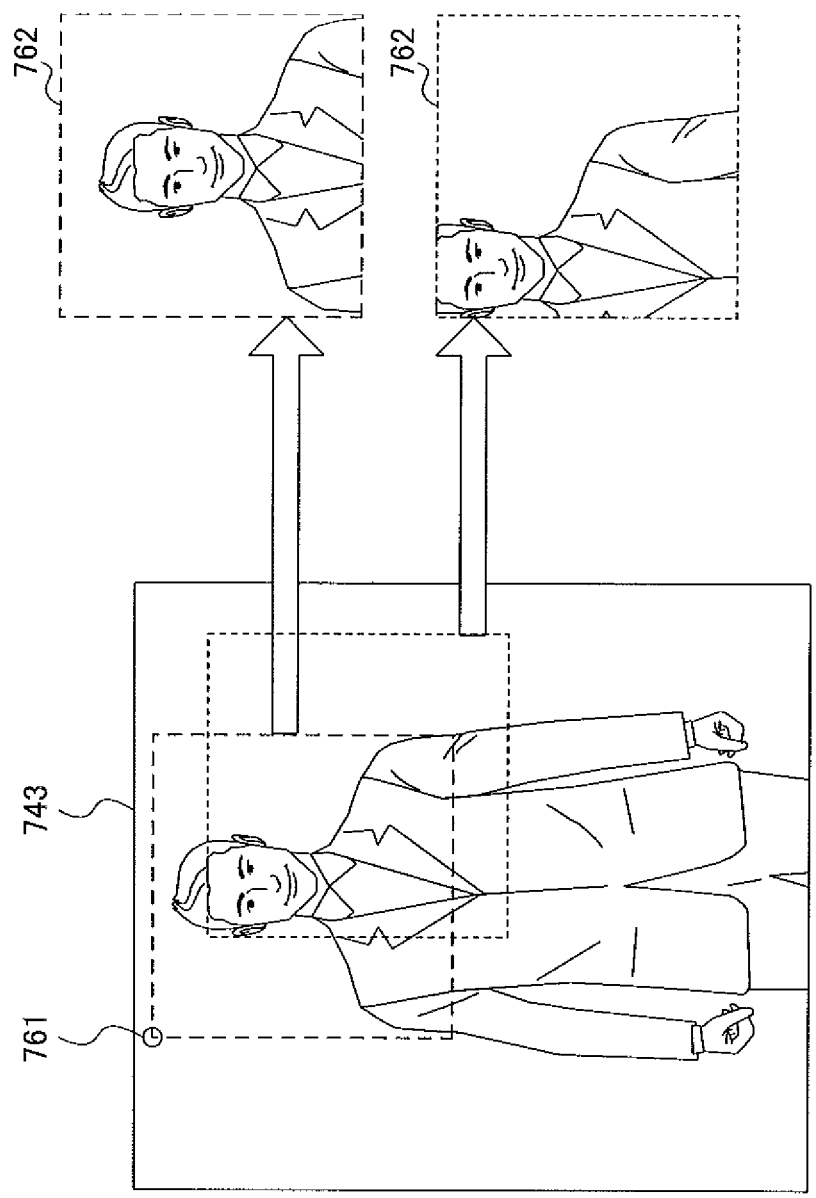
FIG. 21 illustrates an example of how a detection window is scanned according to the present embodiment.

FIG. 21 illustrates how scanning of the detection window is performed.

As shown in FIG. 21, evaluation section 430 scans detection window 761 that is the same size (a width of w pixels×a height of h pixels) as the sample omega image from, for example, the left upper side of evaluation image 743 to the right lower side thereof. At each position, evaluation section 430 acquires an image that is obtained by cutting out a portion surrounded by detection window 761 as cut-out image 762. In this case, it is assumed that evaluation section 430 acquires L cut-out images 762.

Next, evaluation section 430 determines whether or not, when the sample omega image that has been selected is superimposed on an evaluation omega shape included in cut-out image 762, a feature indicating an edge can be seen in pixels corresponding to the sample omega shape in cut-out image 762. That is, evaluation section 430 determines whether or not a shape that is approximate to the sample omega shape is included at the same position in cut-out image 762.

Specifically, for each pixel corresponding to the sample omega shape, for example, evaluation section 430 determines whether or not an edge exists at a corresponding portion of cut-out image 762. Evaluation section 430 calculates a value obtained by dividing the number of pixels at which it is determined that an edge exists by the total number of pixels of the sample omega shape as a matching score. Hereunder, processing that calculates this matching score is referred to as "edge matching processing."

Note that, for example, the correlation with the positions of the shoulder joints of a person is different between an end portion of a shoulder and a top part of the head. Therefore, shoulder-position calculating section 440 may be configured so that, for each position of an omega shape that is indicated by maximum likelihood omega feature value K', the influence of the relevant position on estimation of a shoulder position differs. In this case, shoulder-position calculating section 440 previously creates a degree of influence list describing, for example, for each point (hereunder, referred to as "omega point") that defines the maximum likelihood omega feature value K', a degree of influence on shoulder position estimation of the relevant point as a weight γ.

A more specific description will be provided hereinafter. For the convenience of description, let us first suppose a case in which $\{\alpha_1, \alpha_2, \alpha_3, \alpha_4\}$ is stored in the first row of regression coefficient matrix A and $\{\beta_1, \beta_2, \beta_3, \beta_4\}$ is stored in the second row thereof.

At this time, $\alpha_1$ means the degree of influence of the radius of an omega point denoted by identification number 1 on estimation of the radius of the right shoulder. Furthermore, $\alpha_2$ means the degree of influence of the radius of the omega point denoted by identification number 1, on estimation of the angle of the right shoulder. In addition, $\alpha_3$ means the degree of influence of the radius of the omega point denoted by identification number 1, on estimation of the radius of the left shoulder. Furthermore, $\alpha_4$ means the degree of influence of the radius of the omega point denoted by identification number 1, on estimation of the angle of the left shoulder.

Similarly, $\beta_1$ means the degree of influence of an angle of the omega point denoted by identification number 1, on estimation of the radius of the right shoulder. Furthermore, $\beta_2$ means the degree of influence of the angle of the omega point denoted by identification number 1, on estimation of the angle of the right shoulder. In addition, $\beta_3$ means the degree of influence of the angle of the omega point denoted by identification number 1, on estimation of the radius of the left shoulder. Furthermore, $\beta_4$ means the degree of influence of the angle of the omega point denoted by identification number 1, on estimation of the angle of the left shoulder.

The position of the omega point denoted by identification number 1 is expressed by a set of a radius and an angle with respect to an evaluation reference point. Accordingly, shoulder-position estimation model storage section 340 converts into numerical form a degree of influence $E_{1 \to RR}$ of the omega point denoted by identification number 1, on estimation of the radius of the right shoulder and a degree of influence $E_{1 \to R\theta}$ of the omega point denoted by identification number 1, on estimation of the angle of the right shoulder using, for example, equations 5 and 6 below. Furthermore, shoulder-position estimation model storage section 340 converts into numerical form a degree of influence $E_{1 \to LR}$ of the omega point denoted by identification number 1, on estimation of the radius of the left shoulder and a degree of influence $E_{1 \to L\theta}$ of the omega point denoted by identification number 1, on estimation of the angle of the left shoulder using, for example, equations 7 and 8 below.

[5]

$$E_{1 \to RR} = \sqrt{\alpha_1^2 + \beta_1^2} \quad \text{(Equation 5)}$$

[6]

$$E_{1 \to R\theta} = \sqrt{\alpha_2^2 + \beta_2^2} \quad \text{(Equation 6)}$$

[7]

$$E_{1 \to LR} = \sqrt{\alpha_3^2 + \beta_3^2} \quad \text{(Equation 7)}$$

[8]

$$E_{1 \to L\theta} = \sqrt{\alpha_4^2 + \beta_4^2} \quad \text{(Equation 8)}$$

Shoulder-position estimation model storage section 340 performs conversion into numerical form of the degrees of influence as described above for all omega points to generate degree of influence list 780. It is thereby possible to select a point that has a large degree of influence.

Shoulder-position estimation model storage section 340 stores the degrees of influence of each omega point in the degree of influence list. Furthermore, shoulder-position estimation model storage section 340 selects the top F omega points that have the largest values from among degrees of influence $E_{1 \to RR}$ to $E_{20 \to RR}$ on estimation of the radius of the right shoulder, and increases a weight score of those omega points by 1 in the degree of influence list. Similarly, shoulder-position estimation model storage section 340 also increases the weight score of omega points that have a large degree of influence with respect to the angle of the right shoulder, the radius of the left shoulder, and the angle of the left shoulder.

Shoulder-position estimation model storage section 340 determines a value of a final weight score of each omega point as being a degree of influence (hereunder, referred to as "weight γ") on estimation of both shoulders. Note that, the value, "F" is determined by experiments or the like taking into account the processing load and the estimation accuracy.

FIG. 22 illustrates an example of the structure of the degree of influence list.

As shown in FIG. 22, degree of influence list 780 describes the degree of influence on right shoulder radius 782, the degree of influence on right shoulder angle 783, the degree of influence on left shoulder radius 784, the degree of influence on left shoulder angle 785, and weight 786 in association with omega point identification information 781.

Subsequently, when evaluating edge matching, evaluation section 430 utilizes weights γ in degree of influence list 780 as a parameter for weighting calculation. More specifically, for each omega point, evaluation section 430 calculates a matching score by multiplying a value obtained by converting a result regarding the presence or absence of an edge in the vicinity of the relevant omega point into a numerical value, by weight γ of the relevant omega point.

Assignment of weights in this manner makes it possible to perform matching that particularly focuses on a portion that has a high degree of correlation to shoulder estimation, and thus to improve the estimation accuracy.

In step S7040 in FIG. 18, evaluation section 430 determines whether or not edge matching processing has been completed for L cut-out images. If edge matching processing for L cut-out images is not yet completed (S7040: No), evaluation section 430 returns to step S7030 and performs edge matching processing for a cut-out image at the next position of detection window 761.

On the other hand, if edge matching processing for L cut-out images has been completed (S7040: YES), evaluation section 430 acquires maximum value $MS_j$ of the obtained L matching scores. Subsequently, evaluation section 430 generates a matching result list describing maximum value $MS_j$ of the matching scores and cutting-out position $C_j$ of the cut-out image for which the relevant maximum value $MS_j$ is obtained, for each sample omega image. However, in this case, if a matching result list has already been generated, evaluation section 430 updates the matching result list by adding the maximum values $MS_j$ of newly obtained matching scores to the list.

FIG. 23 illustrates an example of the structure of the matching result list.

As shown in FIG. 23, matching result list 770 describes, for each sample omega image, cutting-out position 772 of a cut-out image for which the matching score becomes the maximum value, in association with sample omega image identification information 771. Matching result list 770 also describes matching score 773 of cutting-out position 772 of a cut-out image for which the matching score becomes the maximum value. Cutting-out position 772 is information that indicates, for example, a position in an evaluation image of a left-upper end portion of the detection window.

Subsequently, in step S7050 in FIG. 18, evaluation section 430 determines whether or not processing for H sample omega images has been completed. That is, for H sample omega images, evaluation section 430 determines whether or not cutting-out position 772 for which a matching score becomes the maximum value as well as the relevant matching score 773 are described in matching result list 770 (see FIG. 23).

If processing is not yet completed for H sample omega images (S7050: No), evaluation section 430 returns to step S7020, then selects the next sample omega image and performs processing.

On the other hand, if processing has been completed for H sample omega images (S7050: YES), evaluation section 430 identifies a sample omega image for which the matching score becomes the maximum value from matching result list 770. Evaluation section 430 outputs a sample omega feature value of the sample omega image for which the matching score becomes the maximum value to shoulder-position calculating section 440, sends a "shoulder position calculating request" to shoulder-position calculating section 440, and returns to the processing in FIG. 2. A sample omega feature value of the sample omega image for which the matching score becomes the maximum value is referred to hereunder as "maximum likelihood omega feature value."

Upon receiving the "shoulder position calculating request," in step S8000 in FIG. 2, shoulder-position calculating section 440 estimates shoulder positions of a person included in the evaluation image using the shoulder position estimation model stored in shoulder-position estimation model storage section 340, based on the received maximum likelihood omega feature value. Shoulder-position calculating section 440 outputs the estimation result to orientation estimation section 500. Upon receiving the estimation result, orientation estimation section 500 estimates a shoulder orientation of the person included in the evaluation image based on the shoulder positions.

Specifically, shoulder-position calculating section 440 identifies a position of a reference point (hereunder, referred to as "evaluation reference point") of a maximum likelihood omega feature value in the evaluation image. In this case, as described above, since the sample omega shape is depicted by taking the center of a cutting-out position as a reference point, when cutting-out position C is (Xc, Ye), the position of the evaluation reference point is (Xc+w/2, Ye+h/2).

In addition, shoulder-position calculating section 440 acquires regression coefficient matrix A that is a shoulder position estimation model from shoulder-position estimation model storage section 340. Subsequently, shoulder-position calculating section 440 calculates evaluation shoulder position feature value Q' of the evaluation image by applying maximum likelihood omega feature value K' as an explanatory variable to regression coefficient matrix A as in equation 9 below, for example.

[9]

$$Q' = K'A$$ (Equation 9)

However, when it is assumed that "[u][v]" mean a two-dimensional array of u rows×v columns, and an omega shape is defined by m=20 points as described above, the values are, Q': [1][4], K': [1][40] and A: [40][4]. Furthermore, a set of a calculated evaluation shoulder position feature value Q' and an evaluation reference point is information that shows the right shoulder position and the left shoulder position of the person included in the evaluation image.

After calculating the right shoulder position and left shoulder position in this manner, shoulder-position calculating section 440 outputs the right shoulder position (Shx1, Shy1) and the left shoulder position (Shx2, Shy2) to orientation estimation section 500 and also sends an "orientation estimation request" to orientation estimation section 500.

Upon receiving the "orientation estimation request," orientation estimation section 500 calculates, as shoulder orientation Vd of the person included in the evaluation image, a vector corresponding to a direction that is rotated 90 degrees clockwise when viewed from above from among horizontal vectors that are orthogonal to a vector from the right shoulder position to the left shoulder position. In addition, orientation estimation section 500 calculates a center point ((Shx1+Shx2)/2, (Shy1+Shy2)/2) of a line segment connecting the right shoulder position and the left shoulder position as a position at the center of the shoulders D.

Orientation estimation section 500 acquires an evaluation image from evaluation image storage section 410. Orientation estimation section 500 superimposes symbols and the like indicating the calculated right shoulder position, left shoulder position, position at the center of the shoulders, and orientation vector on the evaluation image, and generates image data of the depicted evaluation result image. Next, orientation estimation section 500 sends an "orientation estimation complete notification" to operation control section 200, and also outputs the generated image data of the evaluation result image to operation control section 200 to display the evaluation result image in processing-content display region 616.

Subsequently, in step S9000, operation control section 200 determines whether or not "end" button 614 has been pressed. If "end" button 614 has not been pressed, operation control section 200 returns to step S2000. In contrast, if "end" button 614 has been pressed, operation control section 200 clears operation screen 610, and sends an "end" notification to shoulder-position estimation model generation section 300 and shoulder-position estimation section 400. Upon receiving the "end" notification, shoulder-position estimation model generation section 300 and shoulder-position estimation section 400 stop the operation.

By performing the above-described operation, person detection apparatus 100 generates a shoulder position estimation model and omega generation information, and based on these model and information, can estimate the shoulder positions and shoulder orientation of a person included in an evaluation image from the evaluation image.

As described above, since person detection apparatus 100 according to the present embodiment uses a shoulder position estimation model that shows a relationship between an omega shape and shoulder positions, person detection apparatus 100 can estimate the shoulder positions and shoulder orientation of a person included in an evaluation image based on the evaluation image. In addition, since person detection apparatus 100 can estimate shoulder positions, it is also possible for person detection apparatus 100 to determine a posture, such as a downward sloping right shoulder or a downward sloping left shoulder, and thus person detection apparatus 100 can contribute to development of technology that estimates a postural state of a person.

That is, person detection apparatus 100 enables the extraction of an overall feature of an omega shape that cannot be extracted using co-occurrence of local features alone such as in the related art. Accordingly, person detection apparatus 100 enables practical use of correlation between an omega shape and a shoulder position that is difficult to be realized unless an overall feature is represented.

Person detection apparatus 100 configured in this manner can be applied, for example, to a system that records moving images and analyzes a direction in which the body of a person is facing based on the recorded moving images. Accordingly, person detection apparatus 100 can be applied to detection of abnormal behavior on a street, analysis of purchasing behavior in a store, or to detection of inattentive driving by a driver or the like.

Although in the above described embodiment, a shoulder position estimation model is generated at shoulder-position estimation model storage section 340 in person detection apparatus 100, a shoulder position estimation model may also be generated at omega feature storage section 330.

In addition, in person detection apparatus 100, a shoulder position estimation model may be generated by principal component analysis with respect to overall omega feature values, instead of multiple regression analysis.

Furthermore, omega feature storage section 330 need not necessarily apply a principal component analysis to omega feature values K (40 dimensions×N sample images) to generate omega generation information. That is, omega feature storage section 330 may generate omega generation information by applying a principal component analysis to data (44 dimensions×N sample images) in which omega feature values K and shoulder position feature values Q that are included in the overall omega feature values are aggregated. In this case, in addition to an omega shape, it is also possible to reconstruct both shoulder positions based on the omega generation information, and omega generation section 420 can generate a sample omega image including an omega shape and both shoulder positions.

Note that, evaluation section 430 may disregard both shoulder positions when evaluating a matching property. Furthermore, in this case, evaluation section 430 can include a function of shoulder-position calculating section 440. That is, evaluation section 430 can estimate both shoulder positions in a sample omega image for which a high level of matching has been determined by the matching evaluation, as the two shoulder positions that should be found.

In addition, person detection apparatus 100 may estimate, as the outline of a person, an outline of another body part, such as a hand or leg, instead of all or part of an omega shape. Moreover, person detection apparatus 100 may estimate, as a state of a part of a person, only one of shoulder positions and the shoulder orientation, or another state such as a position of a wrist or a direction in which a forearm is extending, instead of estimating both of the shoulder positions and the shoulder orientation. That is, the present invention can be applied to an apparatus that estimates a state of a variety of parts highly correlated with the outline of a person.

The disclosure of the specification, the drawings, and the abstract included in Japanese Patent Application No. 2010-274675, filed on Dec. 9, 2010, is incorporated herein by reference in their entirety.

INDUSTRIAL APPLICABILITY

A person detection apparatus and a person detection method according to the present invention are useful in that they can estimate a state of a part of a person from an image.

REFERENCE SIGNS LIST

100 Person detection apparatus
200 Operation control section
300 Shoulder-position estimation model generation section
310 Sample image storage section
320 Omega feature generation section
330 Omega feature storage section
340 Shoulder-position estimation model storage section
400 Shoulder-position estimation section
410 Evaluation image storage section
420 Omega generation section
430 Evaluation section
440 Shoulder-position calculating section
500 Orientation estimation section

The invention claimed is:

1. A person detection apparatus, comprising:
an evaluation section that acquires an omega shape as an entire outline of a head and shoulders of a person from an evaluation image; and
an estimation section that estimates, on a basis of an estimation model that shows a relationship between the predetermined outline of a person and a state of a predetermined part of the person, a state of the predetermined part of a person included in the evaluation image based on the predetermined outline acquired from the evaluation image,
wherein:
the omega shape is defined by a positional relationship between a plurality of points forming the omega shape; and
the plurality of points include at least a point at an end portion of each of a left shoulder and a right shoulder and a point on each of a left side and a right side of a neck.

2. The person detection apparatus according to claim 1, wherein the positional relationship between the plurality of points is represented based on a distance or an angle with respect to a reference point that is set by a user.

3. The person detection apparatus according to claim 2, further comprising:
a feature generation section that acquires the omega shape of a person included in a sample image and a position of the shoulders of the person; and
the estimation model generation section that generates the estimation model based on the omega shape and the position of the shoulders acquired by the feature generation section.

4. The person detection apparatus according to claim 3, wherein the feature generation section displays the sample image, and receives a setting for the omega shape and a setting for a position of the shoulders from a user for each of the sample images.

5. The person detection apparatus according to claim 4, wherein the estimation model generation section generates the estimation model by performing a multiple regression analysis using information showing the omega shape as an explanatory variable and information showing a position of the shoulders as an objective variable.

6. The person detection apparatus according to claim 5, further comprising:
an omega generation section that generates, when a plurality of the omega shapes are used to generate the estimation model, one or a plurality of sample omega shapes based on the plurality of omega shapes, wherein
an evaluation section acquires the omega shape by matching between the sample omega shape and an edge portion of the evaluation image.

7. The person detection apparatus according to claim 6, wherein the omega generation section generates the plurality of sample omega shapes based on a result of a principal component analysis with respect to information showing the plurality of omega shapes and information showing a position of the shoulders.

8. A person detection method, comprising:
acquiring an omega shape as an entire outline of a head and shoulders of a person from an evaluation image; and
estimating, on a basis of an estimation model that shows a relationship between the predetermined outline of a person and a state of a predetermined part of the person, a state of the predetermined part of a person included in the evaluation image based on the predetermined outline acquired from the evaluation image;
wherein:
the omega shape is defined by a positional relationship between a plurality of points forming the omega shape; and
the plurality of points include at least a point at an end portion of each of a left shoulder and a right shoulder and a point on each of a left side and a right side of a neck.

* * * * *